United States Patent [19]
Crowell

[11] Patent Number: 5,402,221
[45] Date of Patent: Mar. 28, 1995

[54] GUIDEPLATE ASSEMBLY HAVING SUBSTRATE VELOCITY CONTROL ARRANGEMENT

[75] Inventor: John A. Crowell, Wilmington, Del.

[73] Assignee: E. I. Du Pont de Nemours and Company, Wilmington, Del.

[21] Appl. No.: 922,656

[22] Filed: Jul. 31, 1992

[51] Int. Cl.$^6$ ............................................. G03G 21/00
[52] U.S. Cl. ................... 355/321; 271/264; 271/271
[58] Field of Search ............. 355/208, 308, 309, 316, 355/321; 271/3, 3.1, 8.1, 13, 15, 226, 236, 238, 240, 250, 264, 269, 270, 271; 346/108

[56] References Cited

U.S. PATENT DOCUMENTS

| | | | |
|---|---|---|---|
| 4,317,138 | 2/1982 | Bryan et al. | 358/291 |
| 4,383,330 | 5/1983 | DeFelice et al. | 378/187 |
| 4,470,691 | 9/1984 | Hoffman | 355/309 X |
| 4,492,455 | 1/1985 | Kawai | 355/309 |
| 4,516,142 | 5/1985 | Yamamoto et al. | 346/160 |
| 4,655,408 | 5/1987 | Toriumi et al. | 346/134 |
| 4,750,016 | 6/1988 | Kusumoto et al. | 271/65 X |
| 4,816,845 | 3/1989 | Soya et al. | 346/108 |
| 4,855,179 | 8/1989 | Maeda | 346/108 |
| 4,891,653 | 1/1990 | Hamada et al. | 346/108 |
| 4,903,954 | 2/1990 | Robertson et al. | 271/7 |
| 5,002,266 | 3/1991 | Kikuchi et al. | 271/3 |
| 5,058,875 | 10/1991 | Stewart | 271/270 X |
| 5,080,345 | 1/1992 | Daniels | 271/250 X |
| 5,215,302 | 6/1993 | Bedzyk | 271/250 X |

FOREIGN PATENT DOCUMENTS

| | | |
|---|---|---|
| 0069384 | 7/1982 | European Pat. Off. . |
| 0291042 | 5/1988 | European Pat. Off. . |
| 0311821 | 9/1988 | European Pat. Off. . |

*Primary Examiner*—Leo P. Picard
*Assistant Examiner*—Christopher Horgan

[57] ABSTRACT

An imaging apparatus having a drive roller in an imaging zone includes a guideplate assembly for controlling the velocity of a substrate. The assembly has a guideplate with the inlet end disposed adjacent to a dispensing magazine and the outlet end disposed adjacent to the imaging zone. The guideplate assembly has a pushing finger movable therealong, a velocity-controlling sidewall and a spring-loaded biasing member disposed along opposed edges of the guideplate. The biasing member urges an edge of the substrate into frictional contact against a portion of the sidewall directly opposite the member while the pushing finger simultaneously engages the substrate to propel the substrate at a predetermined controlled velocity toward the outlet end of the guideplate against the frictional force imposed on the substrate by the sidewall. The predetermined controlled velocity is at least ninety percent of the rotational speed of the drive roller. Upon engagement with an idler roller in the imaging zone substantially no velocity perturbation is imparted to the substrate.

9 Claims, 6 Drawing Sheets

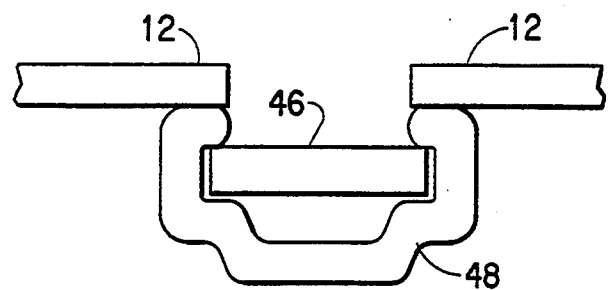
FIG. 3A
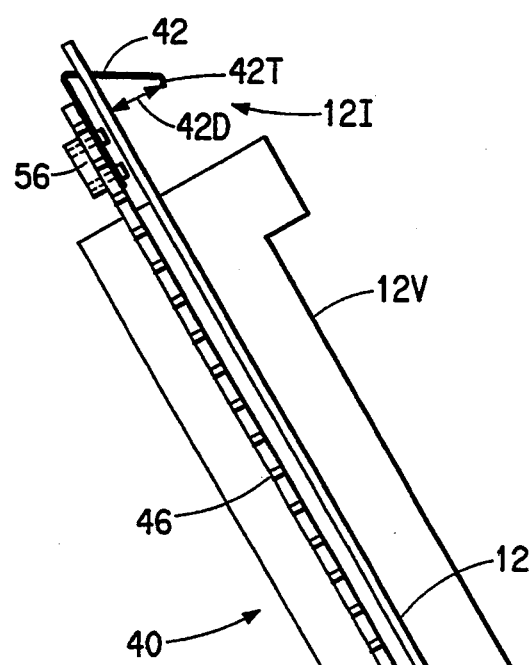
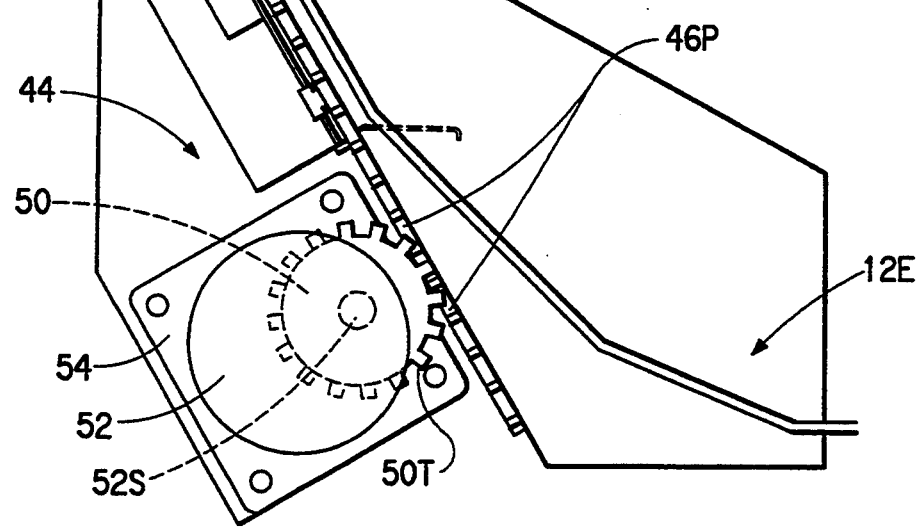
FIG. 3

GUIDEPLATE ASSEMBLY HAVING SUBSTRATE VELOCITY CONTROL ARRANGEMENT

BACKGROUND OF THE INVENTION

Field of the Invention

The present invention relates to a laser imaging apparatus, and in particular, to a laser imaging apparatus having a velocity control arrangement.

Description of the Prior Art

In an imaging apparatus in which a laser beam scans a photosensitive substrate in a direction perpendicular to the direction of transport of the substrate while the substrate is being transported, it is essential that the transport of the substrate be carried out at a constant speed, i. e., without perturbations, to obtain an image of good quality. Otherwise, imaging artifacts are created on the imaged substrate. Such artifacts include, for example, disturbed images, images of impaired quality, or banding (i.e., irregularities in the density of scanning lines).

U.S. Pat. No. 4,885,759 (Maeda) discloses a laser scanning apparatus which includes a rotatable subscanning drum and at least one nipping roller in pressing contact therewith and rotatable by the drum. The nipping roller(s) has an elastic member thereon which attenuates any vibrations. In one embodiment, a substrate is forced into nipping engagement with the sub,-canning drum and two spaced nipping rollers. Imaging of the substrate occurs after the substrate is controlled by a nip of at least one of the nipping rollers and the subscanning drum. The sheet thickness is accommodated by the deformation of the elastic members of the nipping rollers. Therefore, the subscanning drum, the nipping rollers, and the sheet are substantially free of the vibration or torque variation due to the forced engagement. In a second embodiment, the subscanning drum forms a nip with one nipping roller. The substrate may be scanned with a laser beam immediately in front of or to the rear of the nipping roller. The manner in which the speed substrate is controlled when the laser is imaging the substrate prior to entry into the nip is not made clear.

U.S. Pat. No. 4,665,408 (Toriumi et al.) discloses a transport mechanism for transporting a sheet in an imaging apparatus which includes an auxiliary scanning drum, a pair of nip rollers held in contact with the scanning drum, a support plate extending substantially horizontally in a sheet transport path, a push lever pivotally mounted at the end of the support plate adjacent to the nip rollers, a stopper pivotally mounted at the other end of the support plate, and a pair of feed nip rollers. A feed mechanism supplies a sheet to the feed nip rollers which feeds the sheet onto the support plate. The push lever urges the trailing edge of the sheet forward. The stopper contacts the leading edge of the sheet and accurately positions the sheet on the support plate when the stopper and the push lever are retracted from the sheet transport path. After retraction of the stopper the push lever resumes pushing the trailing edge of the sheet until the same is gripped at its leading edge between the rotating auxiliary scanning drum and the rotating nip rollers. The sheet is transported by the nip rollers and the scanning drum. Imaging of the sheet occurs in a space between the nip rollers. There appears to be no teaching that the transporting mechanism can accurately control the transport of the sheet to suitably image the leading edge of the sheet if the laser imaging of the sheet occurs prior to entry into the nip.

U.S. Pat. No. 4,492,455 (Kawai) discloses a laser imaging apparatus which includes a subscanning drum and spaced nipping rolls. The nipping rolls are initially offset from the subscanning drum. The drum continuously rotates at a constant speed. A stopper is disposed downstream of the drum and positioned in the sheet feeding path. A sheet is transported until it abuts against the stopper, and the nip roll or rolls are moved pressing against the sub-scanning drum, thus sandwiching the sheet therebetween. The stopper is retracted from the sheet feeding path whereby the sheet is moved in the sub-scanning direction. The imaging of the film by a laser begins after the film is captured in at least one nip. Since the sheet is captured in the nip before laser imaging begins, the substrate motion is carefully controlled during imaging.

Also, it is believed desirable to image to all edges of the substrate to create a frame-like area (or border) of high density on the substrate surrounding the diagnostic image areas. The high density frame reduces the eyestrain of a diagnostician when reading the diagnostic images on a back-lit lightbox. In the case where a substrate is transported by a single pair of nip rollers, it is difficult to image the leading edge or the trailing edge of the substrate to create a complete border since, at some time during imaging, the substrate is not controlled by nip rollers.

It is also believed desirable to provide an imaging apparatus which is smaller in footprint size than existing apparatuses of this kind. This results in an architecture for the imaging apparatus in which the substrate may be influenced by forces, particularly gravitational forces, during transport of the substrate as the substrate is being imaged. If not accommodated these forces can detrimentally influence the film image quality. So there arises a need in a laser imaging apparatus to control the velocity of a substrate during imaging of the substrate, before the transport of the substrate is controlled by nip rollers. Additionally, the velocity control prior to the nip must be able to introduce the substrate into the nip of the nip rollers during imaging of the substrate without disrupting the substrate motion in any way.

SUMMARY OF THE INVENTION

The present invention relates to an apparatus for imaging a substrate of the type having an imaging zone therein, a drive roller and a cooperating idler roller being disposed in the imaging zone, and a magazine for dispensing an imaging substrate. The improvement thereto in accordance with the invention comprises a guideplate assembly for controlling the velocity of the substrate as the same moves toward the imaging zone.

The guideplate assembly itself comprises: a guideplate having an inlet end and an outlet end thereon, with the inlet end of the guideplate being disposed adjacent to the dispensing magazine and the outlet end being disposed adjacent to the imaging zone, the guideplate having at least one velocity-controlling sidewall disposed along a one edge of the guideplate; a pushing finger movable along the guideplate from a first position adjacent the inlet end of the guideplate to a second position; and a spring-loaded biasing member disposed adjacent to a edge of the guideplate opposite to the velocity-controlling sidewall. The biasing member is operable to urge an edge of the substrate into frictional contact against a portion of the sidewall directly opposite the member while the pushing finger simultaneously engages the trailing edge of the substrate thereby to propel the substrate at a predetermined controlled velocity toward the outlet end of the guideplate against the frictional force imposed on the substrate by the sidewall. The predetermined controlled velocity is at least ninety percent of the rotational speed of the drive roller so that upon engagement with the idler roller substantially no velocity perturbation is imparted to the substrate, whereby the substrate is imaged from leading edge thereof.

In the preferred case, the distance between the outlet end of the guideplate and an axis through the drive roller increases from the one edge of the guideplate toward the other edge, with the greatest distance being defined at the edge of the guideplate having the velocity-controlling sidewall thereon. The guideplate assembly is mounted above the axis of the drive roller. Also in the preferred case, the guideplate has a generally planar region thereon with a generally concave region adjacent thereto.

The imaging apparatus may further include a cam assembly engagable with the biasing member for retracting the same and/or a pin retractably mounted adjacent to the outlet end of the guideplate.

BRIEF DESCRIPTION OF THE DRAWINGS

The invention will be more fully understood from the following detailed description, taken in accordance with the accompanying drawings, which form a part of this application and in which:

FIG. 3 is a side elevational view taken along view lines 3—3 in FIG. 2 showing in fuller detail a pusher mechanism used on the guideplate assembly of the present invention, while FIG. 3A is a sectional view taken along section lines 3A—3A of FIG. 3 illustrating a channel in which moves a drive for a pushing finger that forms part of the guideplate assembly in accordance with the present invention.

DETAILED DESCRIPTION OF THE INVENTION

Figure 1:
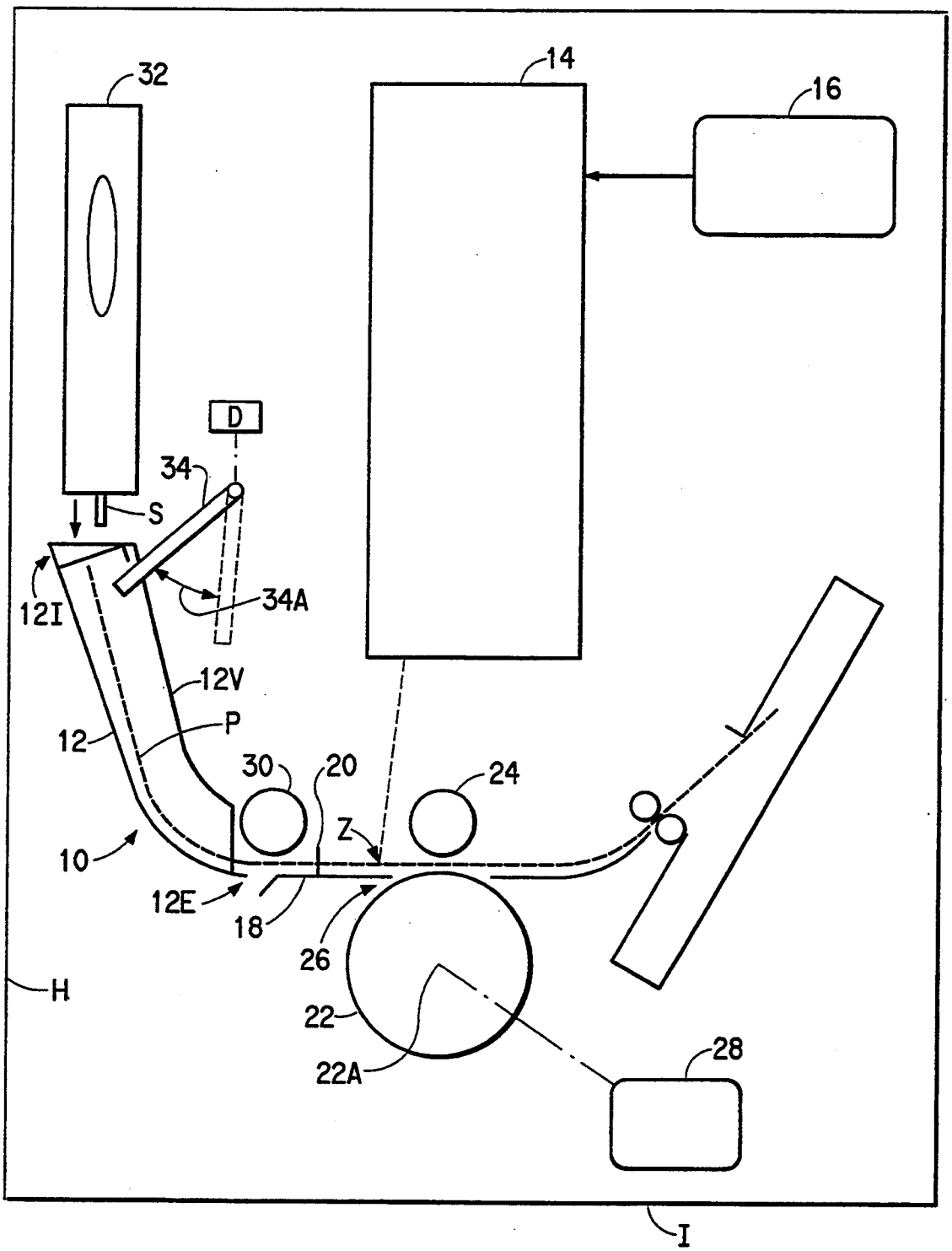
FIG. 1 is a stylized pictorial and block diagrammatic representation of the various functional elements forming a laser imaging apparatus, including a guideplate assembly for controlling the velocity of a substrate as the same moves therealong in accordance with the present invention.

Throughout the following detailed description similar reference numerals refer to similar elements in all Figures of the drawings.

With reference to FIG. 1 shown is a stylized pictorial and block diagrammatic representation of the functional elements of a laser imaging apparatus generally indicated by the reference character I. The laser imaging apparatus I includes a guideplate assembly 10 in accordance with the present invention. As will be more fully developed the guideplate assembly 10 includes a guideplate 12 having an inlet end 12I, an outlet end 12E and a velocity-controlling sidewall 12V thereon.

The laser imaging apparatus I includes a laser exposure unit 14 mounted within a framework or housing H. The laser exposure unit 14 is operable under control of an electronic controller housed in a suitable module 16. A support plate 18, upon which the imaging zone Z is defined, is disposed oppositely of the laser exposure unit 14. The support plate 18 has a retractable pin 20 thereon. A photosensitive substrate S presented to the support plate 18 is drawn through the imaging zone Z by a cooperative action of a drive roller 22 and associated idler roller 24. The drive roller 22 and idler roller 24 form a nip 26. Motive energy to rotate the drive roller 22 at a predetermined angular velocity, or speed, is imparted to the drive roller 22 from a suitable motor drive 28. The magnitude of the speed of the drive roller is selected to correspond to the rate at which pixels of image information are being imaged on the substrate. This feature is disclosed and claimed in copending application Ser. No. 07/692,654 filed Apr. 29, 1991 in the names of Faulhaber and Taylor and assigned to the assignee of the present invention (IM-406).

A second idler roller 30 is located above the support plate 18 generally adjacent to the outlet end 12E of the guideplate assembly 12. A photosensitive substrate S is dispensed into the inlet end 12I of the guideplate 12 from at least one magazine 32 provided for that purpose.

A flapper 34 is pivotally secured within the housing H and movable in the direction of the arrow 34A by a suitable drive D between an operating position (solid line) and a retracted position (dashed line). In the operating position the flapper 34 deflects a substrate S dispensed from the magazine 32 to the guideplate 12. The action of the flapper 34 is most beneficial in the event the substrate S, as dispensed, is extremely bowed or curled.

A photosensitive substrate S received at the inlet end 12I of the guideplate 12 is guided in a controlled fashion therealong toward the nip 26 formed by the rollers 22, 24. The rollers 22, 24 draw the substrate S through the imaging zone Z. The path P of the photosensitive substrate S is indicated in FIG. 1 by indicted by the bold dash line.

Since the imaging zone Z is located upstream of the nip 26 imaging of the substrate S is commenced before the substrate S is fully under the control of by the rollers 22, 24. The control function performed by the guideplate assembly 10 eliminates perturbations in the velocity of the substrate and permits imaging of the substrate S to begin precisely at its leading edge.

Figure 2:
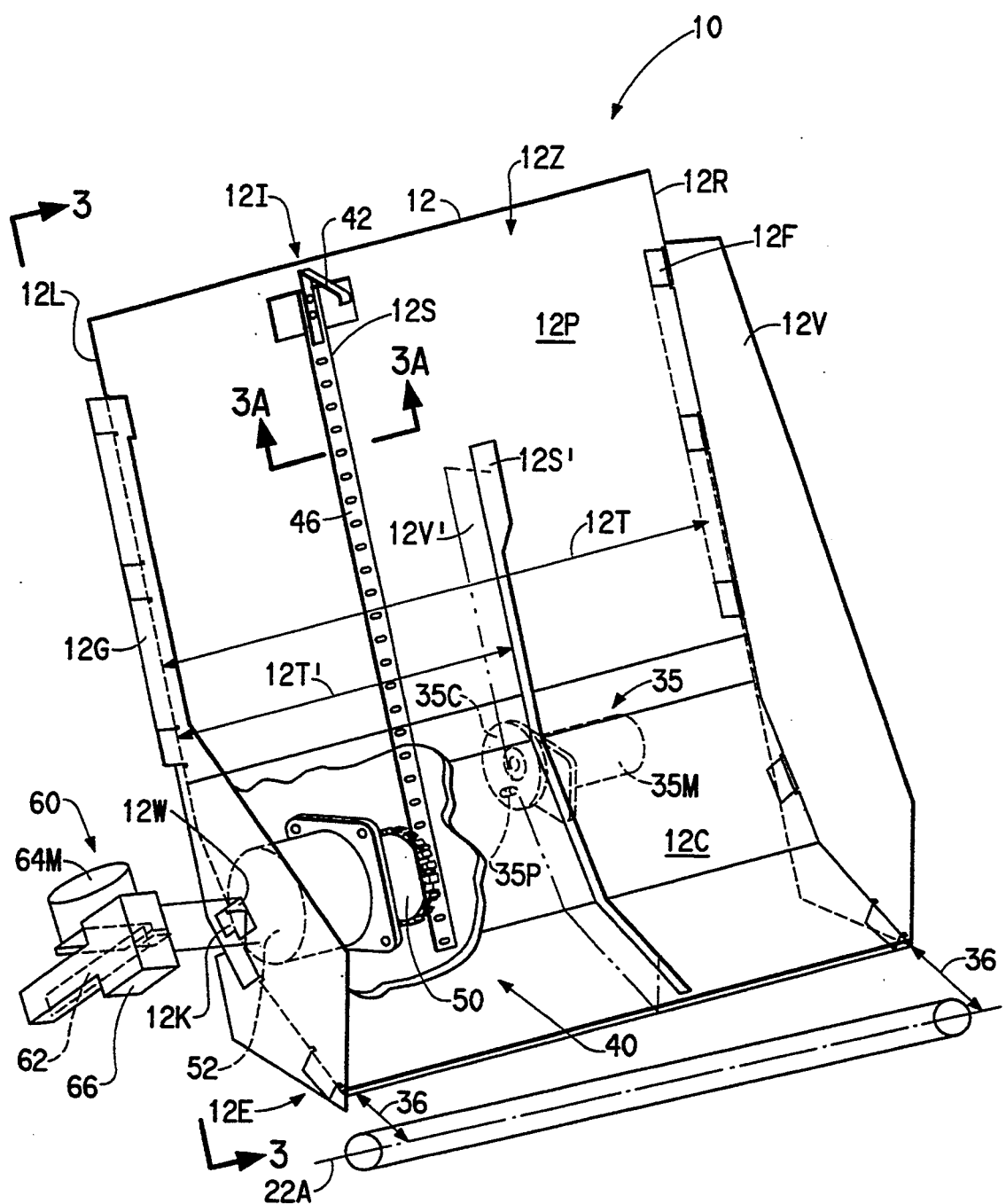
FIG. 2 is a more detailed perspective view of a guideplate assembly in accordance with the present invention.
Figure 4:
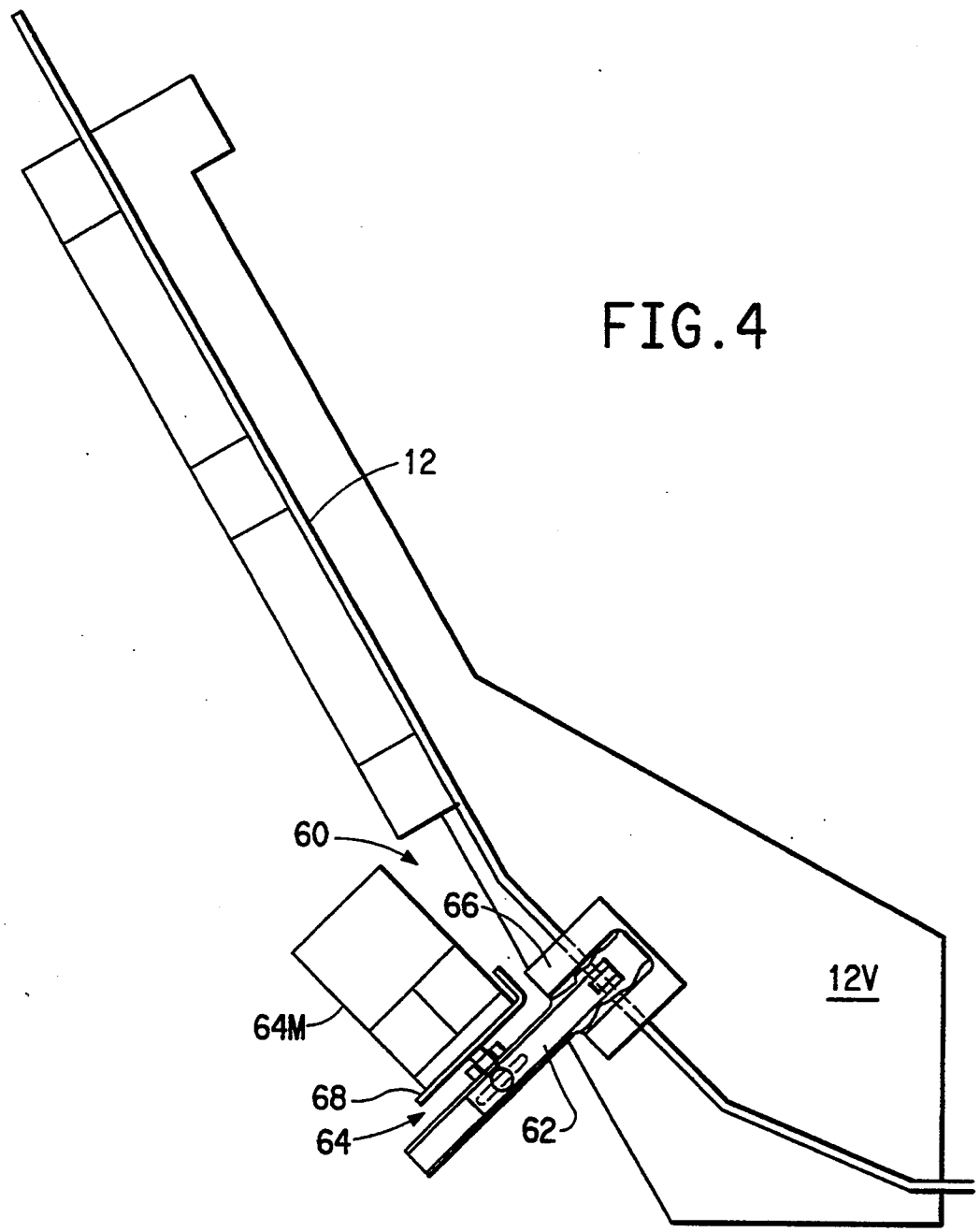
FIGS. 4, 5 and 6 are, respectively, a side elevational view, a front elevational view, and a perspective view showing in fuller detail a finger mechanism used on the guideplate assembly of the present invention.
Figure 5:
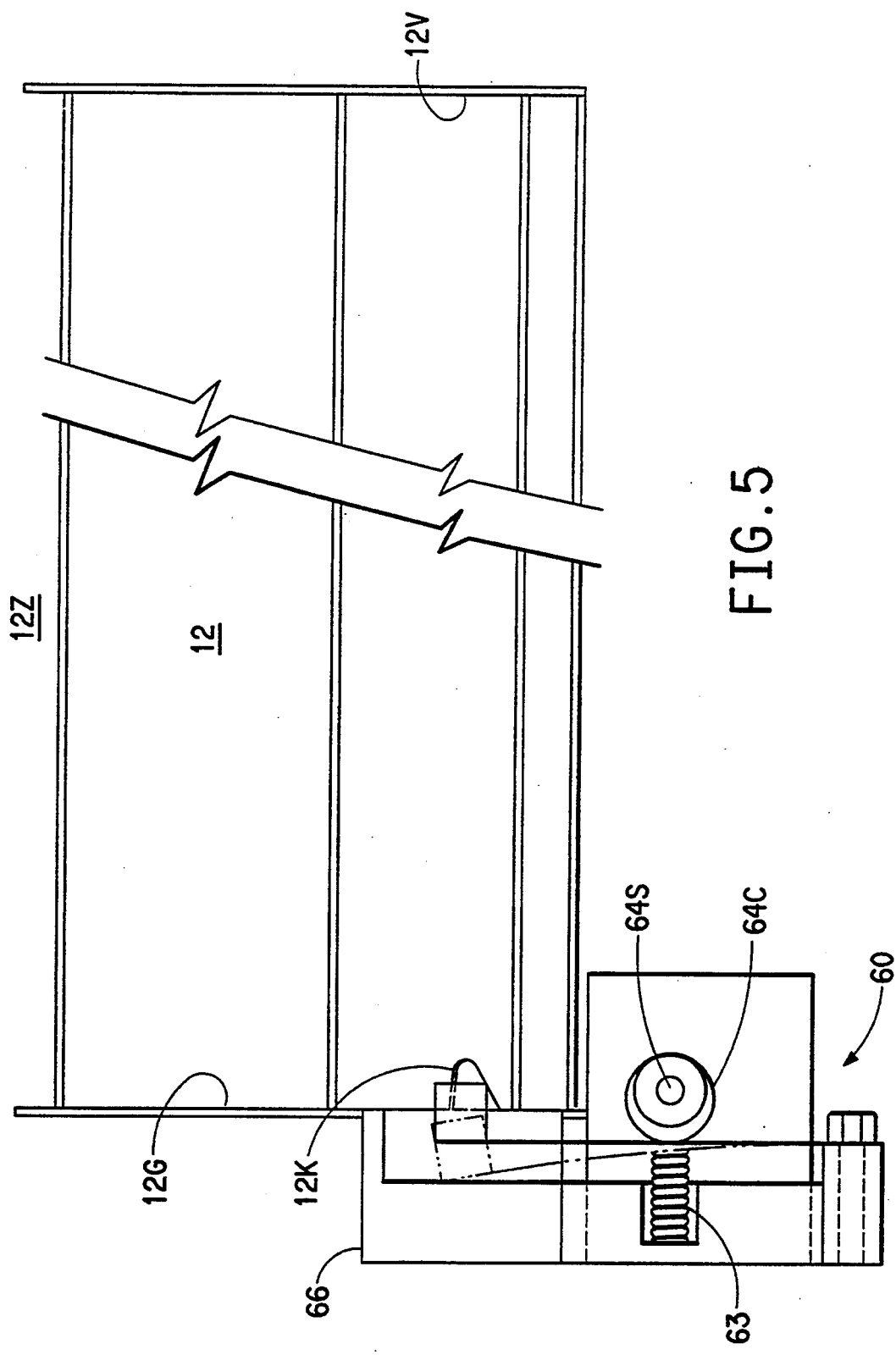
Figure 6:
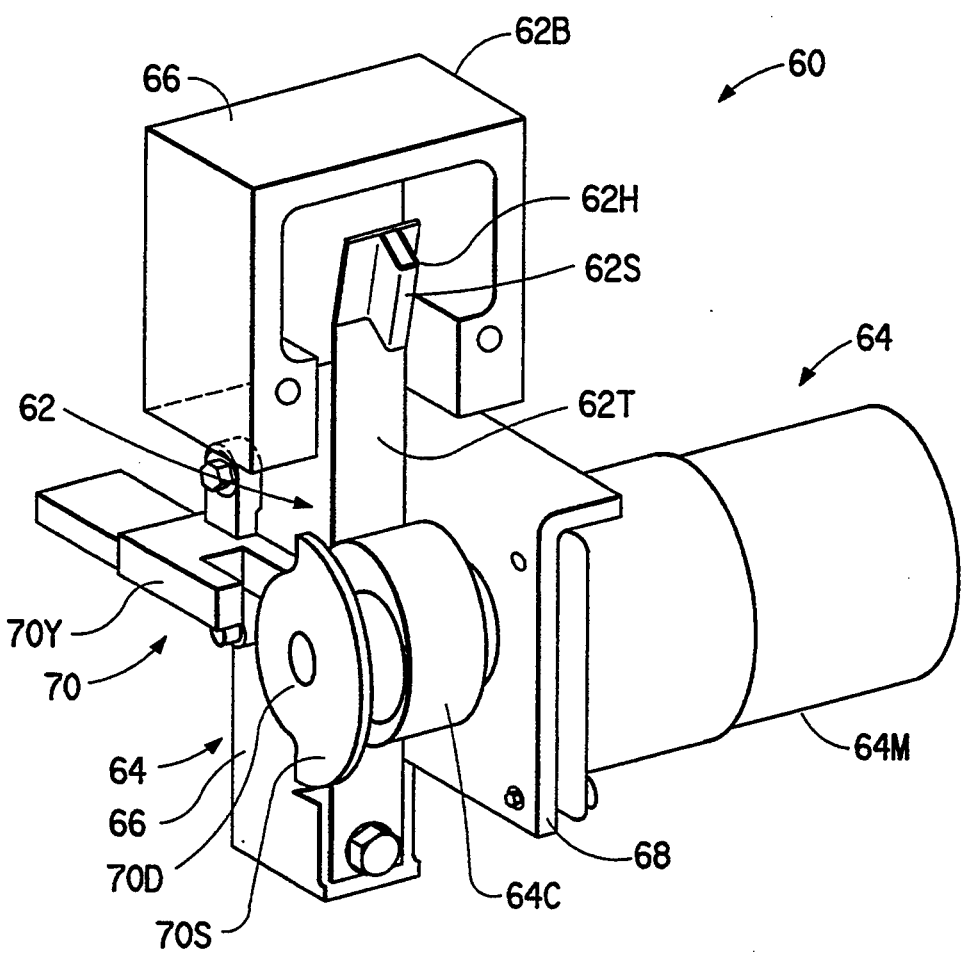

FIG. 2 is a more detailed perspective view of a guideplate assembly 10 in accordance with the present invention. The guideplate 12 has a generally planar upper region 12P and a generally concave lower region 12C. A guidewall 12G is disposed along the lateral edge 12L of the guideplate 12. The guidewall 12G has a window 12W therein. The window 12W registers with a cutout 12K formed in the lower concave region 12C of the guideplate 12. The velocity-controlling sidewall 12V is fixed adjacent the lateral edge 12R of the guideplate 12 and extends along both the planar upper region 12P and the generally concave lower region 12C. The fixed sidewall 12V may be separate from but securely mounted to the guideplate 12 as by flanges 12F. Alternatively, the fixed sidewall 12V may be formed integrally with the guideplate. The operative, confronting surfaces of the guideplate 12, the guidewall 12G, and the velocity-controlling sidewall 12V cooperate to define a chute-like substrate transport zone 12Z.

A first slot 12S extends generally axially along the planar upper region 12P of the guideplate 12. The slot 12S is preferably more proximal to the guidewall 12G than to the velocity-controlling sidewall 12V. The guideplate 12 has a transverse dimension 12T measured between the guidewall 12G and the fixed, velocity-controlling sidewall 12V. The dimension 12T is sized to accommodate a substrate S having a predetermined first transverse dimension, typically fourteen inches (for 14×17 inch images).

A secondary slot 12S' extends generally axially along the guideplate 12, the slot 12S' being located between the guidewall 12G and the sidewall 12V. The transverse dimension of the guideplate 12 may be narrowed, as at 12T', to accommodate other sized substrates (e.g., eight inches, for an 8×10 inch image) by the elevation of one (or more) retractable, auxiliary, velocity-controlling sidewall 12V' (shown in dot-dash lines). The auxiliary velocity-controlling sidewall 12V' is elevated and retracted by a cam assembly 35. The cam assembly 35 includes a pin 35P eccentrically mounted to a cam 35C connected to the shaft of a motor 35M. As many auxiliary slot(s) 12S' as are necessary are formed in the guideplate 12 for this purpose. The slot 12S is positioned on the guideplate 12 with this variability of substrate dimension in mind. It has been found most practical to locate the slot 12S generally about one-third the transverse distance from the guidewall 12G to the velocity-controlling sidewall 12V, thereby to best accommodate the various sized substrates.

For a purpose to be made more clear herein the distance 36 between the outlet end 12E of the guideplate 12 and the axis 22A of the drive roller 22 increases as one proceeds from the guidewall 12G (mounted at the edge 12L) toward the velocity-controlling sidewall 12V (mounted at the edge 12R). This is depicted, albeit in an exaggerated fashion for clarity of illustration, in FIG. 2. In the preferred instance the greatest dimension of the distance 36 is defined at the edge 12R of the guideplate 12 having the velocity-controlling sidewall 12V thereon.

In the preferred case the guideplate 12 is fabricated from sheet metal but other materials, such as plastic may be used. The operative surfaces of the guideplate 12, the guidewall 12G and the velocity-controlling sidewalls 12V, 12V' impart uniform frictional forces to the substrate traveling through transport zone 12Z.

The guideplate 12 is mounted above the axis 22A of the drive roller 22 at a substantially vertical orientation. Typically the planar portion 12P of the guideplate 12 lies at a slight inclination (on the order of about fifteen (15) degrees) with true vertical. If desired, the portion 12P of the guideplate 12 may be completely vertical. The guideplate 12 is mounted within the housing H in whatever orientation desired by any suitable means of attachment.

As may be seen from FIGS. 2, 3 and 3A the guideplate assembly 10 further includes a substrate propelling arrangement 40 having a pushing finger 42 and an associated drive 44. The drive 44 is mounted beneath the operative surface of the guideplate 12 while a portion of the pushing finger 42 extends through the first slot 12S and lies thereabove. The finger 42 is movable with respect to the guideplate 12 from a first position adjacent the inlet end 12I of the guideplate 12 to a second position substantially adjacent to the outlet end 12E thereof. In FIG. 3 the first position of the finger 42 is shown in solid lines, while the second position thereof is illustrated in dashed lines.

The finger 42 has a projecting tang 42T thereon. The tang 42T lies a predetermined distance 42D above the operative surface of the guideplate 12. The tang 42T serves to hook the trailing edge of the substrate S in the event the same assumes a curled or bowed configuration while on the guideplate 12. As will be developed the pushing finger 42 engages the trailing edge of a substrate S to propel the same along the guideplate 12.

In its preferred implementation the drive 44 for the pushing finger 42 includes a generally stiff, perforated tape 46 mounted for movement within a channel 48 supported from the undersurface of the guideplate 12. The teeth 50T of a drive sprocket 50 engages with the perforations 46P of the tape 46. The sprocket 50 is attached to the shaft 52S of a drive motor 52. The motor 52 is mounted on a bracket 54 secured beneath the guideplate 12. Suitable for use as the motor 52 is the stepping motor manufactured and sold by Eastern Air Devices Inc., Dover, N.H. as model GLA23GCK-200A. The finger 42 is secured directly to the tape 46, as by a bolt and nutplate arrangement 56. The channel 48 is best illustrated in FIG. 3A. The channel 48 has a central groove 48G that accepts the bolt and nutplate arrangement 56.

With reference to FIGS. 2, 4, 5 and 6 the guideplate assembly 10 further includes a substrate biasing arrangement generally indicated by the reference character 60. The biasing arrangement 60 comprises a spring-loaded biasing assembly 62 and an actuating cam assembly 64. The biasing assembly 62 is mounted within a mounting block 66 that is itself attached to the guidewall 12G in the vicinity of the window 12W therein.

The biasing assembly 62 includes a flexible spring tongue member 62T cantilevered upwardly from its point of attachment on the mounting block 66. The tongue member 62T is positioned such that the enlarged head 62H thereof is retractably projectable into the volume of the transport zone 12Z through the registered window 12W and cutout 12K. The head 62H has a substrate-engaging edge or surface generally indicated at 62S thereon.

The head 62H of the biasing tongue member 62T is normally urged to project into the transport zone 12Z by the resiliency of its material assisted by a separate spring element 63. Preferably the tongue member 62T is fabricated from beryllium copper, although any suitable alternative material may be used. The head 62H is retracted from the transport zone 12Z by the action of the actuating cam 64C (forming part of the cam assembly 64) operating against the tongue 62T.

The cam 64C is mounted to a shaft 64S of a drive motor 64M also forming part of the cam assembly 64. The drive motor 64M is mounted to the plate 68. Suitable for use as the motor 64M is the motor manufactured and sold by Maxon Precision Motors, Inc., Burlingame, Calif., as model number 41,030.030-00.00-195.

The angular position of the cam 64C is monitored by a position sensing arrangement 70. The sensing arrangement 70 includes a disc 70D having a projecting segment 70S thereon and a corresponding sensing yoke 70Y. The disc 70D is mounted to the shaft 64S of the motor 64M for rotation therewith. The interposition of the projecting segment 70S into the yoke 70Y interrupts a sensing beam traversing the tines of the yoke 70Y thereby to provide an indication of the angular position of the cam 64. The yoke 70Y is connected to the bracket 62B.

In use, the retractable pin 20 is initially interposed into the path of transport P of the substrate S and the flapper 34 initially occupies its retracted position. The head 62H of the biasing member 62 lies outside of the transport zone 12Z. The drive roller 22 is rotated at its predetermined operational velocity.

A substrate S dispensed from the magazine 32 is channelled by the guidewall 12G and the velocity-controlling sidewall 12V through the transport zone Z and beneath the idler roller 30 until the leading edge of the substrate strikes against the pin 20. The pin 20 restrains the substrate S from further forward motion along the path P. As the flapper 34 is moved toward its operating position it engages the trailing edge of the substrate to bring the same to within a predetermined close distance of the guideplate 12. This close distance is within the distance 42D that the tang 42T lies above the guideplate 12, so that the tang 42T may hook the trailing edge of the substrate if such action is necessary.

The cam assembly 64 is actuated to cause the cam 64C to engage the tongue 62T to flex the same and thereby to bring a biasing surface 62S on the head 62H against the edge of the substrate proximal thereto. This action urges the opposite edge of the substrate S into frictional contact against a portion of the sidewall 12V directly opposite the head 62H. The pin 20 is retracted and the drive motor 54 is actuated to move the pushing finger 42 into engagement against the trailing edge of the substrate. Movement of the finger 42 from its initial to final position pushes the substrate S along the operative surface of the guideplate 12 toward the outlet end thereof.

The simultaneous action of the biasing arrangement 60 and the propelling arrangement 40 propels the substrate S through the transport zone Z at a predetermined controlled velocity. The velocity is controllably limited by the frictional force imposed on the substrate by the sidewall 12V. The linear velocity the substrate S is, in the preferred case, at least ninety percent of the rotational speed of the drive roller. In the more preferred case the linear velocity the substrate S is in the range of ninety-five to ninety-eight percent of the rotational speed of the drive roller.

As a result of the foregoing, when the substrate engages with the idler roller 24 little, or substantially no velocity perturbation is imparted to the substrate. By thus controlling the velocity of the substrate S as it is drawn through the imaging zone Z the substrate may be imaged, without banding, from leading edge thereof.

As the substrate is received within the nip 26 and its velocity controlled by the drive roller 22 the biasing force imparted by the biasing arrangement 60 is withdrawn from the substrate. Owing to the position of the outlet end 12E of the guideplate 12 relative to the axis 22A of the drive roller 22, as the substrate S is thereafter drawn through the imaging zone Z the edge of the substrate separates from sidewall 12V. Thus, no frictional drag that would cause a velocity perturbation is imposed on the substrate S.

Those skilled in the art, having the benefit of the teachings of the present invention as hereinabove set forth may effect numerous modifications thereto. Such modifications as are discussed herein and which appear to those skilled in the art are to be construed as lying within the scope of the present invention, as defined by the appended claims.

What is claimed is:

1. In an apparatus for imaging a substrate having an imaging zone therein, a drive roller and a cooperating idler roller being disposed in the imaging zone, a magazine for dispensing an imaging substrate, the improvement comprising:

a guideplate assembly for controlling the velocity of the substrate as the same moves toward the imaging zone, the guideplate assembly comprising:

a guideplate having an inlet end and an outlet end thereon, the inlet end of the guideplate being disposed adjacent to the dispensing magazine and the outlet end being disposed adjacent to the imaging zone, the guideplate having at least one velocity-controlling sidewall disposed along one edge of the guideplate;

a pushing finger movable along the guideplate from a first position adjacent the inlet end of the guideplate to a second position;

a spring-loaded biasing member disposed adjacent to the edge of the guideplate opposite to the sidewall;

the biasing member being operable to urge an edge of the substrate into frictional contact against a portion of the sidewall directly opposite the member while the pushing finger simultaneously engages the trailing edge of the substrate thereby to propel the substrate at a predetermined controlled velocity toward the outlet end of the guideplate against the frictional force imposed on the substrate by the sidewall, the predetermined controlled velocity being at least ninety percent of the rotational speed of the drive roller so that upon engagement with the idler roller substantially no velocity perturbation is imparted to the substrate, whereby the substrate is imaged from leading edge thereof.

2. The imaging apparatus of claim 1 further comprising a cam assembly engagable with the biasing member for retracting the same.

3. The imaging apparatus of claim 1 wherein the drive roller has an axis therethrough, and wherein the distance between the outlet end of the guideplate and the axis of the drive roller increases from the one edge of the guideplate toward the other edge thereof.

4. The imaging apparatus of claim 1 further comprising a pin retractably mounted adjacent to the outlet end of the guideplate.

5. The imaging apparatus of claim 1 wherein the guideplate has a generally planar region thereon.

6. The imaging apparatus of claim 5 wherein the guideplate has a generally concave region thereon adjacent to the planar region.

7. The imaging apparatus of claim 1 wherein drive roller has an axis therethrough, and wherein the guideplate assembly is mounted above the axis of the drive roller.

8. The imaging apparatus of claim 7 wherein guideplate is substantially vertical.

9. The imaging apparatus of claim 7 wherein the apparatus has a substantially vertical reference axis extending therethrough, and wherein the guideplate is inclined to the vertical reference axis.

* * * * *